United States Patent [19]

Lister

[11] Patent Number: 5,156,446
[45] Date of Patent: Oct. 20, 1992

[54] BARRICADE LIGHT LOCK APPARATUS

[76] Inventor: John F. Lister, 1341 Ojai Rd., Santa Paula, Calif. 93060

[21] Appl. No.: 826,081

[22] Filed: Jan. 27, 1992

[51] Int. Cl.[5] .................................................. F21L 7/00
[52] U.S. Cl. .................................. 362/191; 362/200; 340/908.1
[58] Field of Search ............. 362/190, 192, 191, 200, 362/367, 196, 223, 224, 311, 375; 340/908.1

[56] References Cited

U.S. PATENT DOCUMENTS

| | | | |
|---|---|---|---|
| 3,221,300 | 11/1965 | Elledge, Jr. | 362/191 |
| 3,506,959 | 4/1970 | Nunn | 362/191 |
| 3,604,914 | 9/1971 | Gibson | 362/191 |
| 4,387,416 | 6/1983 | Decker | 362/191 |
| 4,516,109 | 5/1985 | Thurston | 362/191 |

Primary Examiner—James C. Yeung
Attorney, Agent, or Firm—Leon Gilden

[57] ABSTRACT

A barricade includes an illumination housing mounting an illumination lens, with the housing including a threaded bore. The barricade structure includes a barricade bore aligned with the threaded bore to receive a threaded locking rod therethrough. The threaded locking rod includes an enlarged head member mounted integrally to the upper distal end of the locking rod, with a handle bar mounted to the head at an oblique angle, wherein the handle is received through a locking loop directed through a further bore directed through a leg portion of the barricade structure to prevent loss of the illumination housing and lens organization.

2 Claims, 4 Drawing Sheets

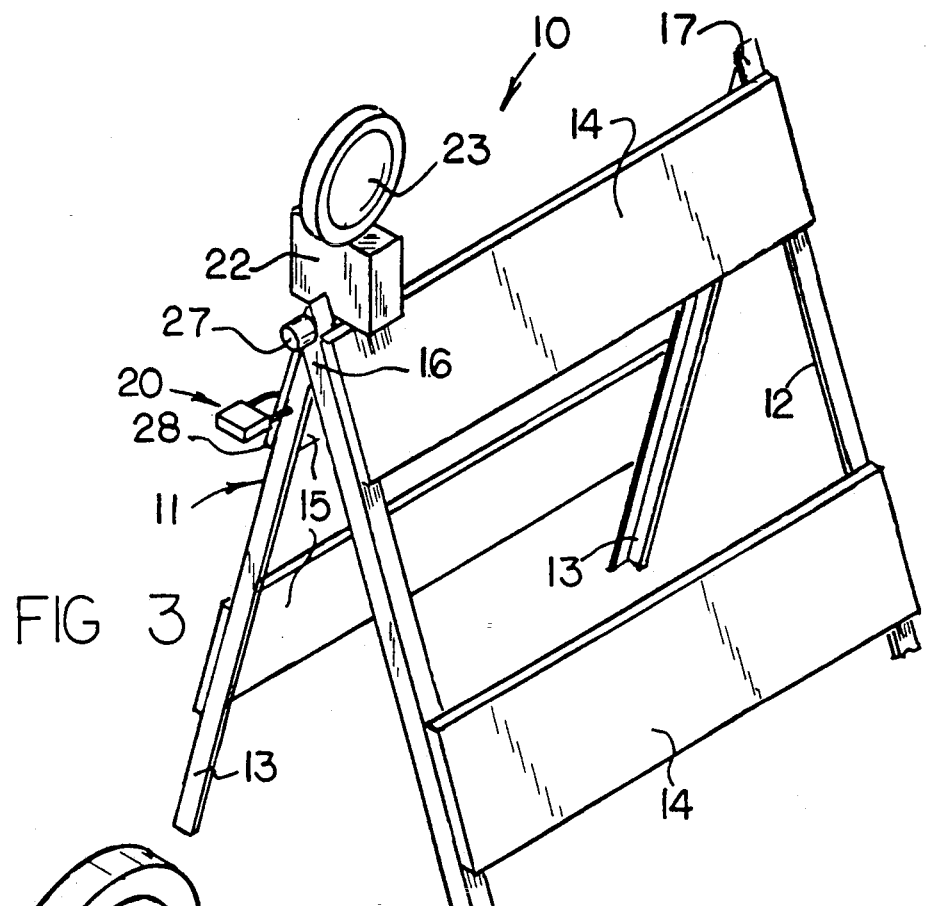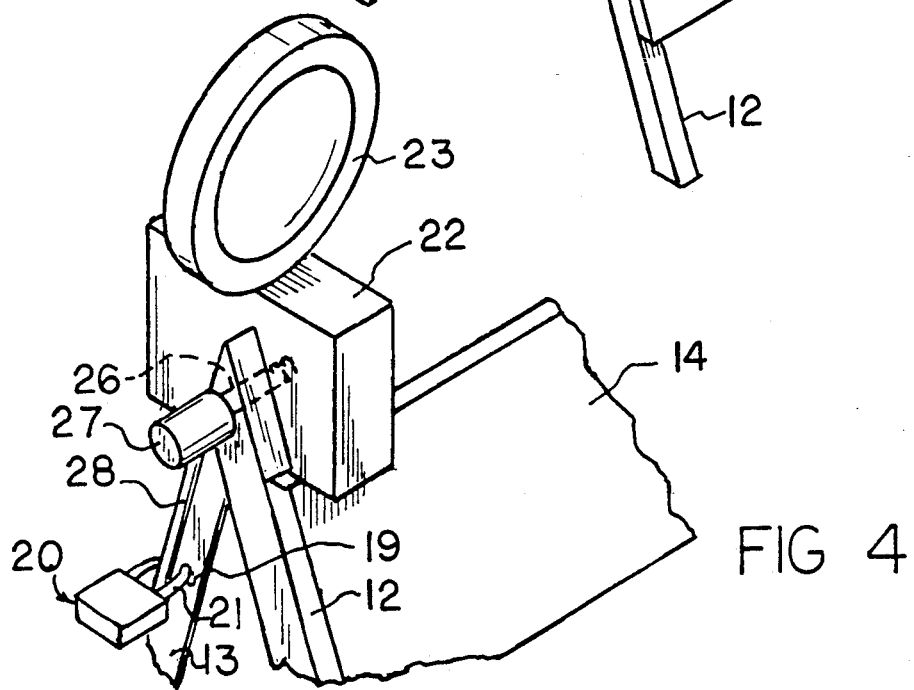

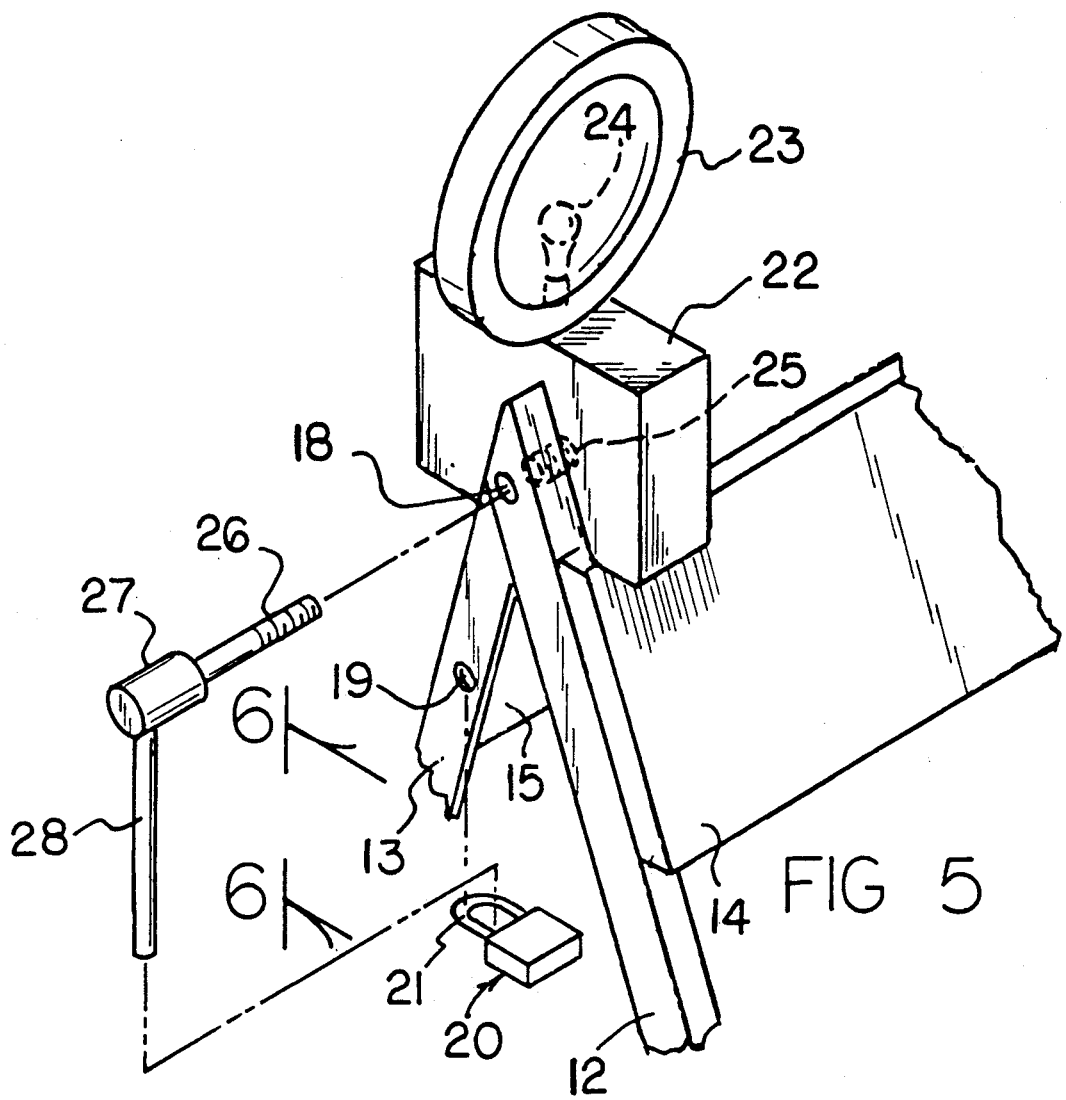
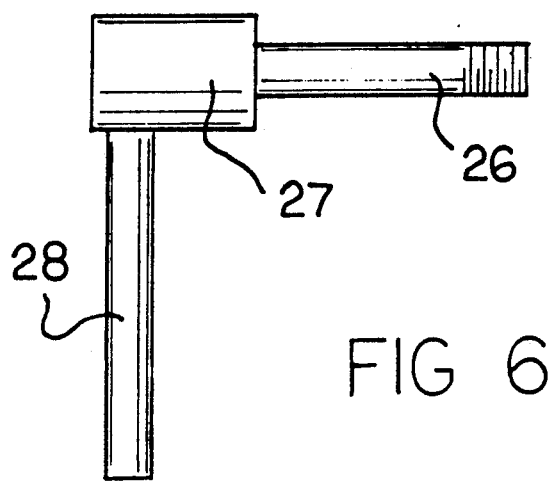

BARRICADE LIGHT LOCK APPARATUS

BACKGROUND OF THE INVENTION

1. Field of the Invention

The field of invention relates to barricade apparatus, and more particularly pertains to a new and improved barricade light locking apparatus wherein the same prevents inadvertent and unauthorized removal of illumination structure relative to a barricade apparatus.

2. Description of the Prior Art

Barricade apparatus is utilized extensively in the prior art in such fields as road construction and the like and particularly during periods of evening hours for indication to pedestrians and motorists as to a construction site. Frequently, the illumination portion of the barricade structure is removed by unauthorized personnel resulting in economic loss as well as a dangerous situation with the illumination portion of the barricade structure not available as a warning device.

A prior art barricade structure sets forth the mounting of a light thereto as set forth in the U.S. Pat. No. 3,506,959. The housing is in turn arranged with a threaded member directed therethrough for securement of the housing to the barricade structure.

U.S. Pat. No. 4,516,109 to Thurston sets forth a road barricade with a flasher light unit, wherein a mounting bracket mounted to the barricade structure is arranged to receive and secure the illumination assembly to the barricade preventing its unauthorized removal.

Accordingly, it may be appreciated that there continues to be a need for a new and improved barricade light lock apparatus as set forth by the instant invention which addresses both the problems of ease of use as well as effectiveness in construction not addressed by the prior art and in this respect, the present invention substantially fulfills this need.

SUMMARY OF THE INVENTION

In view of the foregoing disadvantages inherent in the known types of barricade apparatus now present in the prior art, the present invention provides a barricade light lock apparatus wherein the same is arranged to fixedly secure in a locked manner an illumination housing and light structure relative to a barricade. As such, the general purpose of the present invention, which will be described subsequently in greater detail, is to provide a new and improved barricade light lock apparatus which has all the advantages of the prior art barricade apparatus and none of the disadvantages.

To attain this, the present invention provides a barricade including an illumination housing mounting an illumination lens, with the housing including a threaded bore. The barricade structure includes a barricade bore aligned with the threaded bore to receive a threaded locking rod therethrough. The threaded locking rod includes an enlarged head member mounted integrally to the upper distal end of the locking rod, with a handle bar mounted to the head at an oblique angle, wherein the handle is received through a locking loop directed through a further bore directed through a leg portion of the barricade structure to prevent loss of the illumination housing and lens organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barricade light lock apparatus which has all the advantages of the prior art barricade apparatus and none of the disadvantages.

It is another object of the present invention to provide a new and improved barricade light lock apparatus which may be easily and efficiently manufactured and marketed.

It is a further object of the present invention to provide a new and improved barricade light lock apparatus which is of a durable and reliable construction.

An even further object of the present invention is to provide a new and improved barricade light lock apparatus which is susceptible of a low cost of manufacture with regard to both materials and labor, and which accordingly is then susceptible of low prices of sale to the consuming public, thereby making such barricade light lock apparatus economically available to the buying public.

Still yet another object of the present invention is to provide a new and improved barricade light lock apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric view, somewhat enlarged, of the barricade light lock structure.

FIG. 5 is an isometric illustration of the invention in an exploded view for ease of illustration of the various components thereof.

FIG. 6 is an orthographic side view of the latch mechanism of the invention.

DESCRIPTION OF THE PREFERRED EMBODIMENT

Figure 1:
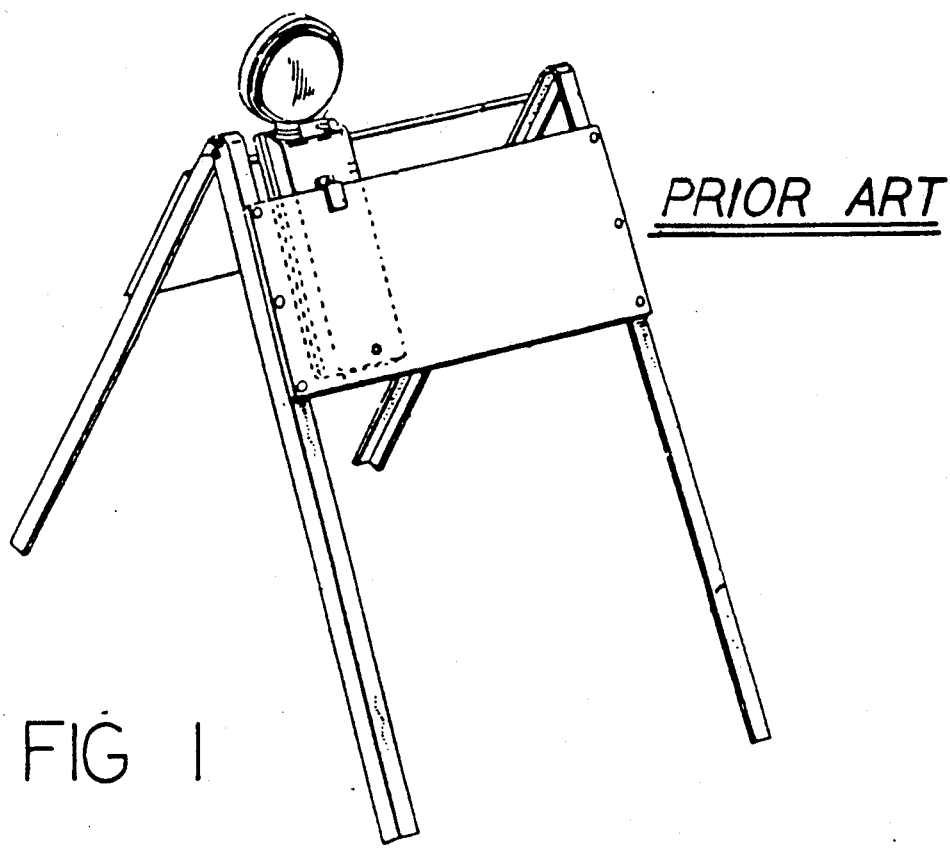
FIG. 1 is an isometric illustration of a prior art barricade light structure.

With reference now to the drawings, and in particular to FIGS. 1 to 8 thereof, a new and improved barricade light lock apparatus embodying the principles and concepts of the present invention and generally designated by the reference numeral 10 will be described.

Figure 2:
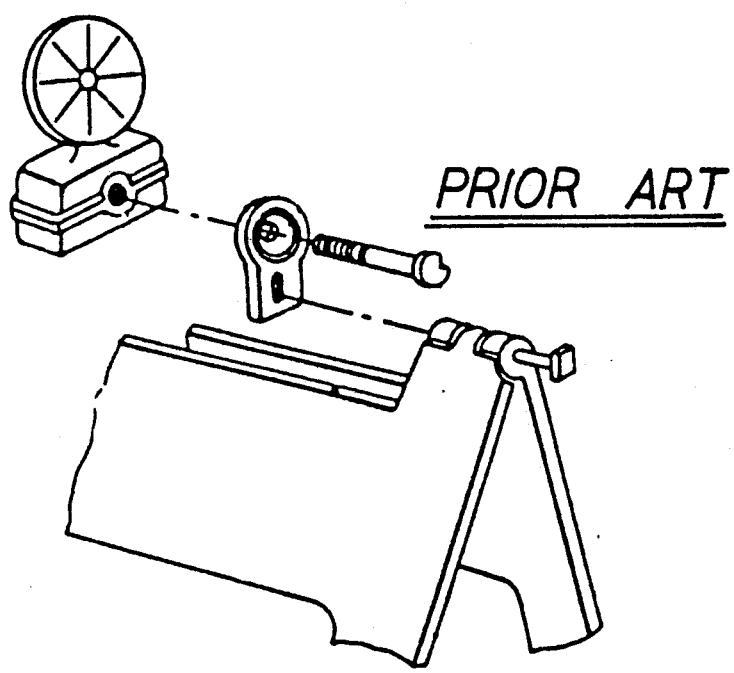
FIG. 2 is an isometric illustration of a further example of a prior art barricade light lock apparatus.

The FIG. 1 illustrates a prior art barricade structure as set forth in U.S. Pat. No. 3,506,959 utilizing threaded members to secure the illumination housing to the barricade structure. The U.S. Pat. No. 4,516,109 as exemplified in the FIG. 2 illustrating the bracket structure to mount the illumination housing relative to the barricade apparatus.

More specifically, the barricade light lock apparatus 10 of the instant invention essentially comprises a barricade assembly 11 including a first pair of spaced parallel legs 12 cooperative with a pair of second spaced parallel legs 13. A first connector panel 14 is directed orthogonally between the first spaced leg pairs 12, with a second connector panel 15 orthogonally directed between the second spaced parallel leg pairs 13. A first and second leg of the first and second leg pairs respectively is joined together at a first junction 16, with a second junction 17 formed by joinder of a further first and second leg member of the first and second leg pairs 12 and 13, as illustrated in the FIG. 3. The first junction 16 includes a first junction bore 18 orthogonally directed through the first junction, wherein a second leg bore 19 directed through a second leg below the first junction bore 18. A lock member 20 including a lock member loop 21 is directed through the second leg bore 19. An illumination housing 22 is positioned upon the barricade structure, with the illumination housing including a lens assembly 23 mounted thereon. The lens assembly includes an illumination bulb 24 positioned therewithin. The illumination housing 22 includes a housing threaded bore 25 that is coaxially aligned with and adjacent the first junction bore 18. In this manner, an externally threaded lock rod 26 is directed through the first junction bore 18 and threadedly received within the housing threaded bore 25. The externally threaded lock rod 26 includes a lock rod head 27 extending diametrically beyond the lock rod 26 at a rear distal end of the lock rod spaced and positioned in abutment with the first junction 16 on an opposed side relative to the housing 22. The lock rod head 27 includes a handle 28 orthogonally mounted to the lock rod head, with the lock rod handle extending downwardly thereof and directed through the lock member loop 21 preventing rotation of the handle relative to the lock rod 26 and thereby preventing removal of the lock rod and of the associated housing 22.

Figure 7:
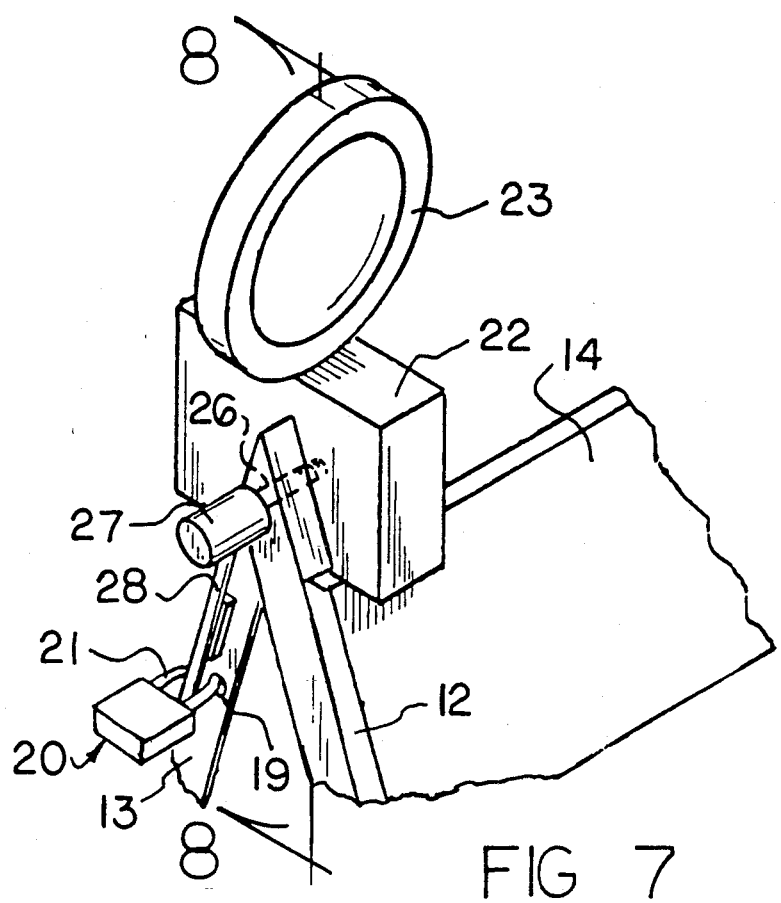
FIG. 7 is an isometric illustration of the illumination housing utilizing a light inner lock for immediate visual indication of removal of the illumination housing.
Figure 8:
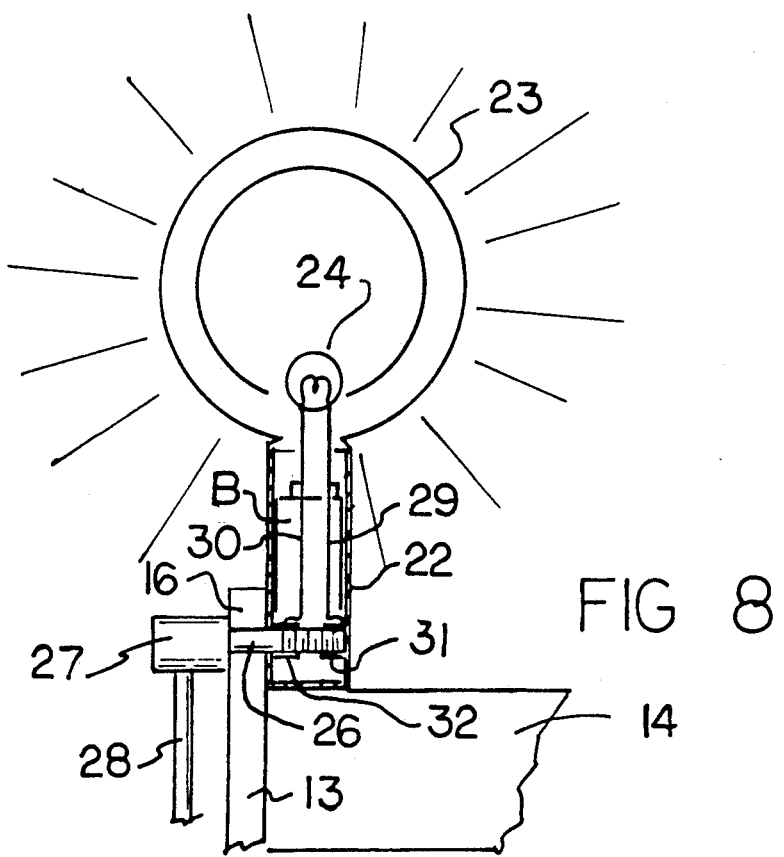
FIG. 8 is an orthographic view, taken along the lines 8—8 of FIG. 7 in the direction indicated by the arrows.

The FIGS. 7 and 8 illustrate a further aspect of the invention, wherein removal of the lock rod 26 effects an operation of the housing 22 to discourage removal of the housing 22 relative to the barricade structure. The housing 22 includes the illumination bulb formed with illumination bulb first and second electrical line 29 and 30 directed into the housing 22 from the lens assembly 23. The first electrical line 29 is directed into a first electrical tube 31, with the second electrical line directed into a second electrical tube 32. The first and second electrical tubes 31 and 32 are coaxially aligned with the housing threaded bore 25 to effect electrical intercommunication of the first and second electrical lines 29 and 30 to permit transmission and completion relative to the illumination bulb 24 in association with a battery member "B" positioned within the housing 22. Removal of the lock rod 26 effects immediate visual alert as to the removal of the illumination structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barricade light lock apparatus, comprising,
  a barricade assembly, including a pair of first legs, including a first connector panel directed between the first legs, and a plurality of second legs, wherein the second legs include a second panel directed between the second legs, one of said first legs is joined to one of said second legs at a first junction, and a further one of said first legs is joined to a further one of said second legs at a second junction, the first junction including a first junction bore, and
  an illumination housing, the illumination housing including a lens assembly mounted to the illumination housing with an illumination bulb mounted within the lens assembly, the illumination housing including an illumination housing threaded bore coaxially aligned with the first junction bore, and a threaded lock rod directed through the first junction bore threadedly received within the housing threaded bore to secure the illumination housing to the first junction, and the threaded lock rod includes a lock rod head, the lock rod head integrally mounted to a rear distal end of the lock rod, with the lock rod head extending diametrically beyond the lock rod, and the lock rod head positioned on an opposed side of the first junction relative to the illumination housing, and a lock rod handle fixedly mounted to the lock rod head, wherein the lock rod handle is orthogonally oriented relative to the lock rod, the lock rod handle oriented adjacent said one second leg, with the one second leg including a second leg bore directed therethrough, the second leg bore receiving a lock member loop directed therethrough, the lock member loop secured to a lock member, and the lock rod handle directed through the loop adjacent the one second leg.

2. An apparatus as set forth in claim 1 wherein the illumination bulb includes a first electrical line and a second electrical line directed to the illumination bulb, the first electrical line and second electrical line directed to a respective first electrical tube and a second electrical tube respectively, the second electrical tube coaxially aligned with the housing threaded bore, wherein the lock rod is directed through the housing threaded bore and through the first tube and the second tube to effect electrical communication between the first tube and the second tube, wherein the first tube and second tube are in electrical communication with a battery member contained within the housing.

* * * * *